Figure 1:
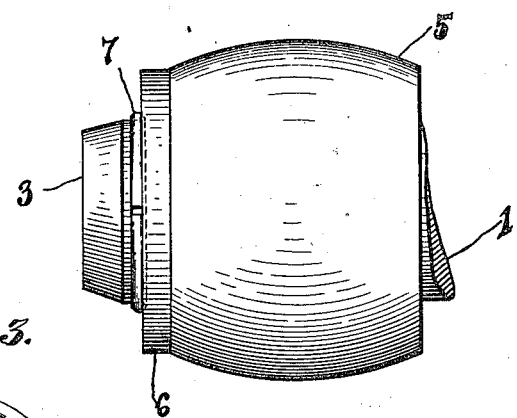

D. WILLIAMSON.
FASTENING DEVICE.
APPLICATION FILED APR. 9, 1912.

1,179,060.

Patented Apr. 11, 1916.

David Williamson Inventor:
by J. W. Freeman
Atty

UNITED STATES PATENT OFFICE.

DAVID WILLIAMSON, OF NEW YORK, N. Y., ASSIGNOR TO THE AUTOPRESS COMPANY, A CORPORATION OF NEW YORK.

FASTENING DEVICE.

1,179,060.  Specification of Letters Patent.  Patented Apr. 11, 1916.

Application filed April 9, 1912. Serial No. 689,682.

*To all whom it may concern:*

Be it known that I, DAVID WILLIAMSON, a citizen of the United States, and a resident of New York city, borough and county of Queens, State of New York, have invented certain new and useful Improvements in Fastening Devices, of which the following is a specification.

My invention relates to fastening devices; and, while it may be embodied in constructions adapted for various purposes, it is more particularly applicable to devices for preventing the axial displacement of a member sleeved on a cylindrical member.

Objects of the invention are to provide an improved device of the character referred to which shall be simple and economical in construction and highly efficient in operation. These and other objects of the invention will in part be obvious and in part more fully explained in the following description.

The invention consists in the novel parts, improvements, combinations and features of construction herein shown and described.

In the drawings, which are referred to herein and form a part hereof, is illustrated an embodiment of the invention, the same serving in connection with the description herein to explain the principles of the invention.

Figure 4:
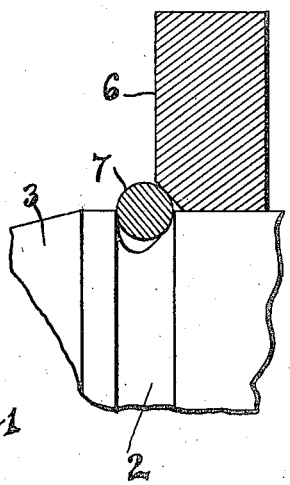
Figure 3:
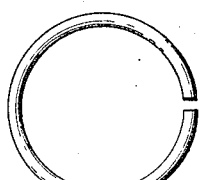
Figure 2:
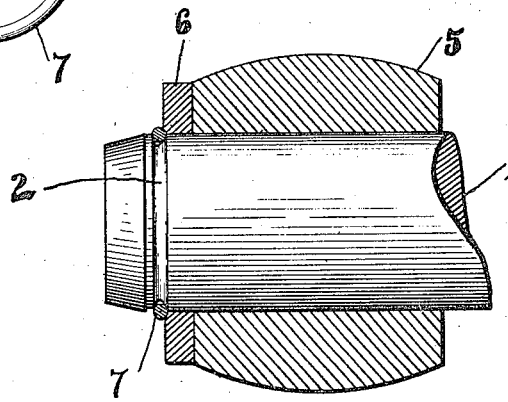

Figure 1 is a perspective view of an embodiment of the invention; Fig. 2 is a view of the same partly in perspective and partly in section; Fig. 3 is a perspective view of a detail; and Fig. 4 is a section of a portion of Fig. 1, showing certain parts enlarged.

A fastening device constructed in accordance with certain principles of the invention comprises in combination, a cylindrical member having a circumferential groove therein, a ring located in said groove, and a member mounted on said cylindrical member at one side of said ring and having a beveled surface arranged to bear against said ring. According to certain other principles of the invention said ring is split, and a washer having its inner periphery outwardly beveled is mounted on the cylindrical member and arranged to have its beveled surface bear against said ring.

Referring now in detail to the drawings, the embodiment of the invention illustrated comprises a cylindrical member which is shown as a stud 1 in which is formed near one end a circumferential groove 2. While said groove may be outlined in various contours, preferably and as shown, see Fig. 4, it is deeper at the side toward the outer end 3 of the stud for reasons presently to be set forth. A member is mounted on this stud, and it is the purpose of the invention to provide means for securing this member against lateral displacement. While, therefore, the mounted member may be of any desired character as required for the use to which it is to be put, for the purposes of illustration there is shown a roller 5 mounted on said shaft 1. To retain said roller 5 in place, preferably and as shown, a washer 6 is mounted on said shaft 1 between said roller 5 and said groove 2, said washer having its inner periphery beveled on the side adjacent the groove so that the beveled surface will bear against a member, as a ring 7, located in said groove, in such manner that the stress communicated from the washer to the ring will be in a direction transverse to the longitudinal axis of the stud 1. Preferably and as shown, the relative arrangement of the ring and the beveled surface of the washer is such that a line drawn perpendicular to the line of tangency of the beveled surface will pass through the opposite wall of the groove. It will be seen that by this arrangement the ring cannot be forced out of the groove 2 by any force exerted on it by the washer 6, and hence the washer 6 and the member 5 which the washer serves will be kept from lateral displacement in the direction of the groove. It will also be noted that the depression of the groove at the outer side, heretofore noted, serves also to keep the ring 7 from being forced out of the groove 2. While said member located in the groove 2 may be of suitable size and shape, preferably and as shown, it is circular in cross-section and of a size fitted for the groove 2. Also, said ring is split, that is, severed transversely, in order that it may be distorted temporarily and thus be the more easily slipped over the end of the stud 1 into its place in the groove 2. To facilitate this temporary distortion and slipping into place of the ring 7, the end of the stud 1 is beveled, preferably and as shown, and it will be seen that the ring can thus be made of smaller and more suitable diameter so as to fit better and be made securely retained in the groove 2.

It will be seen that a retaining device of the character described can be used in a great many ways, as with nuts, to take the place of cotter pins, as a hub attaching device, and the like, and furthermore that in suitable cases the washer may be dispensed with and the member mounted on the cylindrical member may be itself beveled to contact with the ring instead of having a beveled washer. It will also be seen that while carrying out the objects of the invention as enumerated, the invention possesses other advantages which will be apparent to those skilled in the art.

The invention in its broader aspects is not confined to the particular embodiment of the invention illustrated and described, as many changes may be made in the details of the invention without departing from its main principles or sacrificing its chief advantages.

I claim:

1. The combination of a cylindrical member having a circumferential groove therein, a split locking ring located in said groove, and a member mounted on said cylindrical member at one side of said ring and having a beveled surface arranged to bear against said ring, whereby stress communicated from said mounted member to said ring will be in a direction transverse to the longitudinal axis of the cylindrical member.

2. In combination with a shaft provided with a circumferential groove, a split locking ring located in said groove, and a member on the shaft provided with a beveled surface to engage said ring, the relation of said groove and beveled surface being such that a line drawn perpendicular to the surface at its line of tangency will pass through the opposing wall of the groove.

3. The combination of a cylindrical member having a circumferential groove therein, a ring circular in cross-section located in said groove, and a member mounted on said cylindrical member at one side of said ring, and having a beveled surface arranged to bear against said ring, said groove being of such shape as to be out of contact with the inner surface of said ring at that portion thereof farthest from said beveled surface.

4. The combination of a cylindrical member having a circumferential groove therein, a split locking ring located in said groove and normally contracted radially to engage said groove closely, and a member mounted on said cylindrical member at one side of said ring, the external diameter of said ring, when contracted into said groove, being greater than the bore of said member adjacent said ring, and said member having a beveled surface adapted to bear against said ring and force it into said groove when said member is moved longitudinally of said cylindrical member toward said ring.

In testimony whereof I have signed my name to this specification, in the presence of two subscribing witnesses.

DAVID WILLIAMSON.

Witnesses:
 MAURICE M. COHN,
 EDWARD LIPSCHUTZ.